(12) United States Patent
Hu et al.

(10) Patent No.: US 8,914,034 B2
(45) Date of Patent: Dec. 16, 2014

(54) LONG-TERM EVOLUTION CIRCUIT SWITCHED FALL BACK ENHANCEMENTS

(75) Inventors: Weidong Hu, Austin, TX (US); Inderpreet Singh Ahluwalia, Austin, TX (US); Yung Choi-Grogan, Issaquah, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 126 days.

(21) Appl. No.: 13/116,877

(22) Filed: May 26, 2011

(65) Prior Publication Data
US 2012/0302239 A1 Nov. 29, 2012

(51) Int. Cl.
| | | |
|---|---|---|
| *H04W 72/00* | (2009.01) | |
| *H04M 1/00* | (2006.01) | |
| *H04W 36/00* | (2009.01) | |
| *H04W 76/04* | (2009.01) | |
| *H04W 76/02* | (2009.01) | |

(52) U.S. Cl.
CPC ........ *H04W 36/0022* (2013.01); *H04W 76/046* (2013.01); *H04W 76/027* (2013.01)
USPC ............ 455/450; 455/552.1; 455/426.1; 455/435.1; 370/328

(58) Field of Classification Search
CPC . H04W 76/046; H04W 76/048; H04W 72/00; H04W 36/18; H04W 72/0406; H04W 76/027; H04W 72/04; H04W 36/14; H04W 74/002
USPC ........... 455/552.1, 553.1, 426.1, 450–453, 455/432.1–444, 435.1–435.3; 370/328
See application file for complete search history.

(56) References Cited

U.S. PATENT DOCUMENTS

| | | | | |
|---|---|---|---|---|
| 2009/0088160 | A1* | 4/2009 | Pani et al. | 455/436 |
| 2009/0238143 | A1* | 9/2009 | Mukherjee et al. | 370/331 |
| 2010/0103889 | A1* | 4/2010 | Kim et al. | 370/329 |
| 2010/0279691 | A1* | 11/2010 | Dwyer et al. | 455/436 |
| 2010/0302937 | A1* | 12/2010 | Hu et al. | 370/225 |
| 2010/0329167 | A1* | 12/2010 | Linden et al. | 370/312 |
| 2011/0080864 | A1* | 4/2011 | Cai et al. | 370/315 |
| 2011/0092196 | A1* | 4/2011 | Stojanovski et al. | 455/418 |
| 2011/0176485 | A1* | 7/2011 | Pudney et al. | 370/328 |
| 2011/0216645 | A1* | 9/2011 | Song et al. | 370/216 |
| 2011/0249575 | A1* | 10/2011 | Dwyer et al. | 370/252 |
| 2011/0274038 | A1* | 11/2011 | Zhu et al. | 370/328 |

OTHER PUBLICATIONS

3GPP TS 23.272 V9.3.0, dated Mar. 2010.*

* cited by examiner

*Primary Examiner* — Daniel Lai
(74) *Attorney, Agent, or Firm* — Amin, Turocy & Watson, LLP

(57) ABSTRACT

The disclosed subject matter relates to an architecture that can provide enhancement with respect to circuit switched fall back. In particular, the architecture can reduce the signaling and delay of conventional systems that are necessitated by establishing a radio resource control connection prior to establishing the circuit switched fall back connection. For example, when user equipment is not in a radio resource control connected state at the time of a circuit switched fall back call, the radio resource control connection can be at least partially avoided by responding to a radio resource control connection request message with a radio resource control connection reject message that includes target cell reselection information.

20 Claims, 11 Drawing Sheets

EXAMPLE CONFIGURATION OF RRC CONNECTION REJECT MSG 108

⋮

EXAMPLE CONFIGURATION OF RESELECTION INFORMATION 112

302 ⎯

IF TARGET CELL 114 IS UMTS COMPLIANT, THEN INCLUDE ARFCN AND PRIMARY SCRAMBLING CODE (PSC)

304 ⎯

IF TARGET CELL 114 IS GSM COMPLIANT, THEN INCLUDE CARRIER FREQUENCY RANGE AND BASE STATION IDENTITY CODE (BSIC)

⋮

FIG. 3

LONG-TERM EVOLUTION CIRCUIT SWITCHED FALL BACK ENHANCEMENTS

TECHNICAL FIELD

The present application relates generally to Long-Term Evolution communications networks, and more specifically to enhancing performance of circuit switched fall back features when user equipment is in a radio resource control idle state.

BACKGROUND

Third Generation Project Partnership (3GPP) Long Term Evolution (LTE) is often marketed as "4G" and represents the latest standard for wireless communications networks. LTE utilizes an Internet Protocol (IP) Multimedia Subsystem (IMS) framework, which leverages packet-based signaling. However, LTE also offers support for previous technologies (marketed as "2G" or "3G"), such as Universal Mobile Telecommunications (UMTS) platforms, Global System for Mobile Communications (GSM) platforms, and Code Division Multiple Access (CDMA) platforms, all of which utilize a different air interface than LTE and can operate according to circuit switching technology rather than packet-based technology.

For example, LTE allows a circuit switched fall back (CSFB) procedure, in which an LTE handset can leverage existing infrastructure of previous 2G or 3G technologies to make or receive a voice call. In other words, the LTE handset can drop an existing LTE connection with an LTE evolved Node B (eNB) and fall back to a 2G or 3G cell (e.g., Node B or base station). Upon completion of the call, the LTE handset can then re-establish a connection with the LTE network.

However, prior to dropping the LTE connection, a radio resource control (RRC) connection according to 3GPP LTE standard TS36.331 is first established in order to pass information to the handset relating to the target 2G or 3G cell that will manage the CSFB call. Once this RRC connection is established and the relevant information has been passed to the handset, the RRC connection is immediately terminated. Thus, when utilizing the CSFB approach, a significant amount of signaling is performed, which leads to increased resource utilization and call setup times. Hence, operations to reduce such signaling or to reduce the call setup time can be quite beneficial.

As noted, the current implementation of CSFB requires an initial RRC connection. As such, there are numerous existing enhancements and/or change requests (CR) that can reduce call setup time when the LTE handset already has an existing RRC connection (e.g., is in an RRC connected state). For example, TS25.331 CR4118, TS36.331 CR0402, and TS36.306 CR0029 have been accepted into the LTE standard to reduce call setup time, yet these enhancements only apply when the handset is already in an RRC connected state. Unfortunately, the LTE handset is not always in an RRC connected state. In fact, research shows that for a significant majority of the time, the LTE handset will be in an RRC idle state when a CSFB call is requested. Current approaches offer no adequate way to reduce CSFB setup time when associated user equipment is in an RRC idle state and/or not in an RRC connected state.

The above-described deficiencies are merely intended to provide an overview of some of the problems of conventional systems and techniques, and are not intended to be exhaustive. Other problems with conventional systems and techniques, and corresponding benefits of the various non-limiting embodiments described herein may become further apparent upon review of the following description.

SUMMARY

The following presents a simplified summary of the disclosed subject matter in order to provide a basic understanding of some aspects of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

The subject matter disclosed herein, in one aspect thereof, comprises a communications architecture that can provide enhancements in connection with circuit switched fall back. In accordance therewith and to other related ends, the architecture can include a network communications component that can be configured to receive a radio resource control connection request message from user equipment. Furthermore, the network communications component can transmit, in response to the radio resource control connection request message, a radio resource control connection reject message.

The architecture can further include a network message component that can be configured to construct the radio resource control connection reject message to include reselection information associated with a target cell that is identified to manage circuit switched fall back for the user equipment. Accordingly, network elements, when responding to a radio resource control connection request, can simply reject the connection request, yet still provide reselection information along with the radio resource control connection reject message. Accordingly, portions of radio resource control connection setup can be avoided, while still enabling a subsequent circuit switched fall back call.

The following description and the annexed drawings set forth in detail certain illustrative aspects of the disclosed subject matter. These aspects are indicative, however, of but a few of the various ways in which the principles of the disclosed subject matter may be employed and the disclosed subject matter is intended to include all such aspects and their equivalents. Other advantages and distinguishing features of the disclosed subject matter will become apparent from the following detailed description of the disclosed subject matter when considered in conjunction with the drawings.

BRIEF DESCRIPTION OF THE DRAWINGS

FIG. 3 provides a block diagram of an example configuration of an RRC connection reject message associated with the disclosed subject matter.

DETAILED DESCRIPTION

Overview

Figure 1:
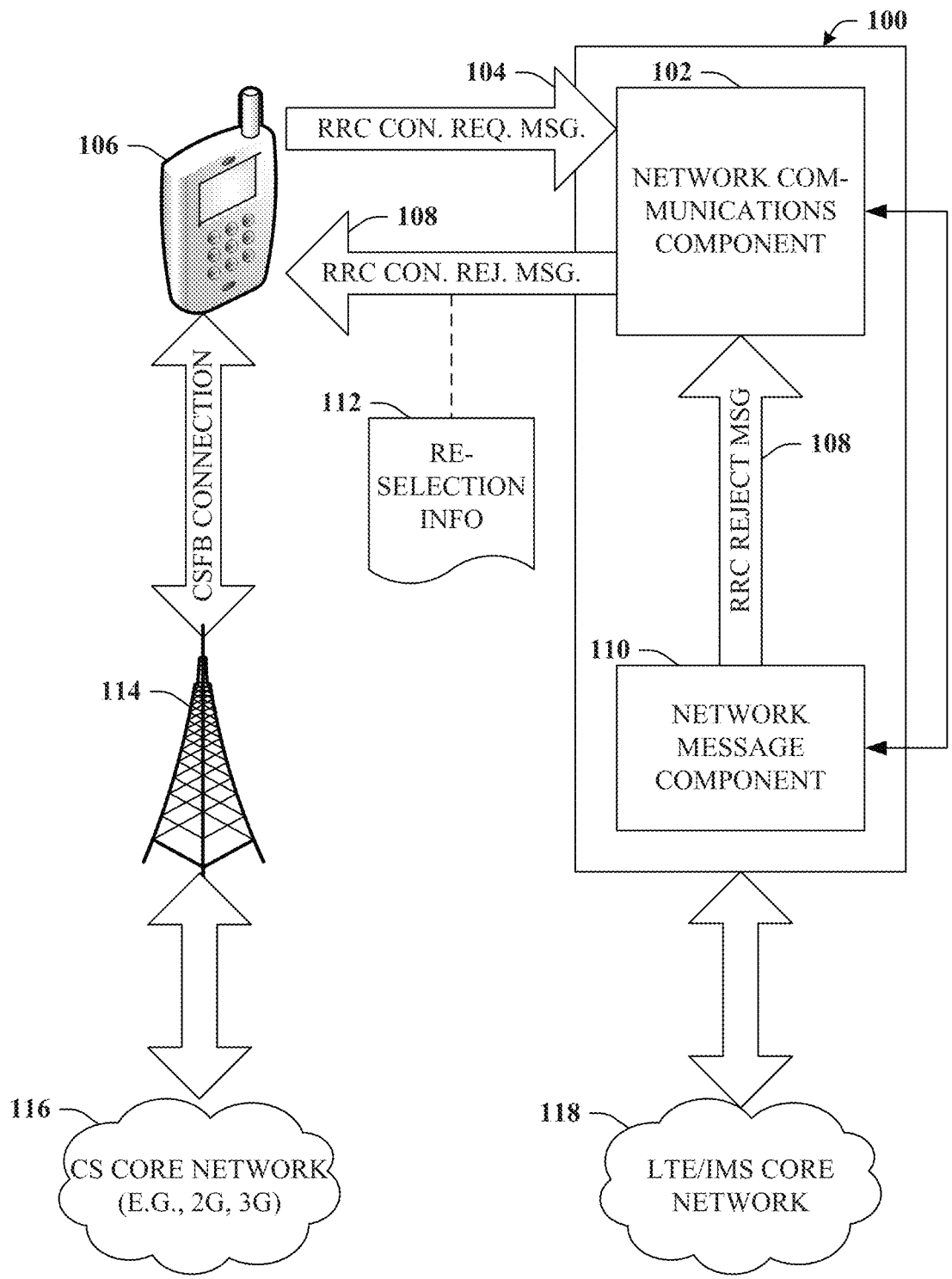
FIG. 1 is a block diagram of a system that can provide network-oriented enhancements in connection with CSFB.

As discussed in the Background section, existing approaches for handling circuit switched fall back (CSFB) are defined in third generation partnership project (3GPP) long term evolution (LTE) TS36.331, which is incorporated herein by reference. These conventional approaches do offer adequate service when a handset or user equipment is already in a radio resource control (RRC) connected state, yet are unable to adequately mitigate an abundance of additional signaling and longer call setup times when the user equipment is in an RRC idle state, which is likely to be the majority of the time.

As such, the disclosed subject matter relates to enhancements over existing systems when user equipment is not in an RRC connected state when a CSFB call is initiated. In particular, the current LTE standard, and existing systems, require user equipment to establish an RRC connection, which is thereafter released to perform CSFB. However, the disclosed subject matter can provide a CSFB indicator and a specific target cell identification to the user equipment without the necessity of establishing an RRC connection, thereby avoiding the attendant network signaling and call setup delays that would otherwise result from establishing an RRC connection.

In particular, two new Establishment Causes are proposed to be incorporated into the LTE standard: 1) Mobile Originating (MO) Call CSFB; and 2) Mobile Terminating (MT) Call CSFB, which are further detailed herein. Irrespective of whether or not these two new Establishment Causes are accepted into the LTE standard, mechanisms are now described that can improve both user and network provider experiences in connection with CSFB. These and other benefits can be provided according to the following.

Assuming user equipment that supports both LTE and CSFB, and the LTE Network also supports CSFB feature, the user equipment can transmit an RRC connection request message to the wireless communications network. The network can respond to the request message differently depending upon whether or not the user equipment is in an RRC connected state or in an RRC idle state. If the user equipment is in an RRC connected state, then the CSFB operation can proceed as is done in conventional systems. However, if the user equipment is in an RRC idle state, then the network can immediately respond with an RRC connection reject message. In other words, the RRC connection currently employed by conventional system prior to enabling CSFB can be avoided.

Rather, the RRC connection reject message can include reselection information relating to a CSFB voice call for a specific target cell, while avoiding the connection setup steps and service request steps employed by conventional systems to establish an RRC connection. Upon receiving the RRC connection reject message, the user equipment can utilize the associated information to rapidly set upon a CSFB call with the target cell of a circuit switching network such as universal mobile telecommunications system (UMTS) node B or a global system for mobile communications (GSM) base station or the like.

LTE CSFB Enhancements

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from by a computing device.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Referring now to the drawing, with reference initially to FIG. 1, system 100 that can provide network-oriented enhancements in connection with CSFB is depicted. Generally, system 100 can include network communications component 102 that can be configured to receive RRC connection request message 104 from user equipment 106, which is further described in connection with FIG. 2. In response to RRC connection request message 104, network communications component 102 can be configured to transmit RRC connection reject message 108, which is further detailed with reference to FIG. 3.

It is appreciated that RRC connection request message 104 can be associated with a mobile originating (MO) call made by user equipment 106, or can be associated with a mobile terminating (MT) call received by user equipment 106, e.g., when user equipment 106 is paged for an incoming voice call. For example, user equipment 106 can transmit RRC connection request message 104 as a result of an outgoing or incoming CSFB call. Moreover, in one or more aspect, network communications component 102 can be included in an evolved node B (eNB) that supports 3GPP LTE according to technical specification TS36.331. Likewise, user equipment 106 can also be required to support 3GPP LTE as well as CSFB functionality.

Figure 2:
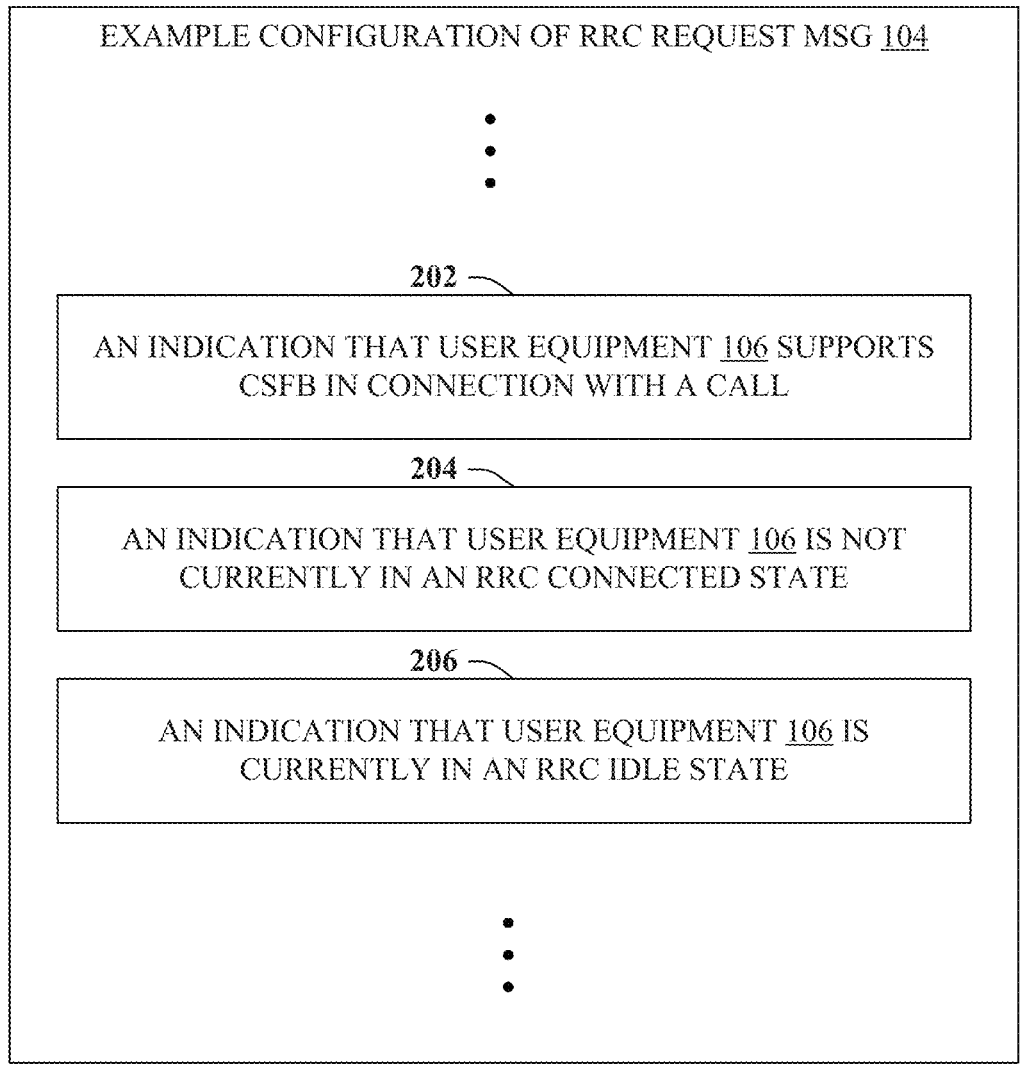
FIG. 2 provides a block diagram of an example configuration of an RRC connection request message associated with the disclosed subject matter.

FIG. 2 provides an example configuration of RRC connection request message 104, whereas FIG. 3 illustrates an example configuration of RRC connection reject message 108, which includes an example configuration of reselection information 112. While still referring to FIG. 1, but turning as well to FIGS. 2 and 3, various concrete examples can now be provided. With particular reference to FIG. 2, example RRC connection request message 104 can include an indication that user equipment 106 supports CSFB in connection with a call such as a mobile originating voice call, a mobile terminated voice call, an emergency call, and so forth, which is depicted by reference numeral 202.

Furthermore, example RRC connection request message 104 can include an indication that user equipment 106 is not currently in an RRC connected state as illustrated by reference numeral 204. Additionally or alternatively, example RRC connection request message 104 can include an indication that user equipment 106 is currently in an RRC idle state as indicated by reference numeral 206. It is appreciated that RRC connection request message 104 can also include other information, such all or a portion of information that exists in conventional RRC connection request messages.

Hence, upon receiving RRC connection request message 104, network communications component 102 can determined that user equipment 106 supports CSFB and that user equipment 106 is not in an RRC connected state. It is appreciated that such information can be either expressly included in RRC connection request message 104 or inherently included as an Establishment Cause, such as MO Call CSFB or MT Call CSFB. Thus, RRC connection request message 104 can therefore include any such Establishment Cause. For example, MO Call CSFB and MT Call CSFB Establishment Causes can be limited by definition only to user equipment 106 that 1) supports CSFB; and 2) is not in an RRC connected state (or is in an RRC idle state). Therefore, by virtue of receiving RRC connection request message 104 with one of these Establishment Causes included therein, network communications component 102 can be instantly apprised of information indicated by all or a portion of reference numerals 202-206.

Once network communications component 102 receives RRC connection request message 104, with associated information (either express or inherent) relating to reference numerals 202-206, RRC connection reject message 108 can be transmitted in response. With particular reference now to FIG. 3, and as noted supra, RRC connection reject message 108 can include reselection information 112 as well as or instead of other information conventionally included. As introduced previously, since delay and resource utilization can be reduced by avoiding any RRC connection (or certain portions of an RRC connection) used by conventional systems, reselection information 112 can include information related to target cell 114 reselection.

In cases where target cell 114 is UMTS-compliant, then reselection information 112 can include an absolute radio frequency channel number (ARFCN) and a primary scrambling code (PSC). Because UMTS reuses frequency spectrum among different cell clusters and further that many cell clusters can be available to user equipment 106, merely providing the ARFCN may not be enough information for user equipment 106 to identify target cell 114 without full scanning. Thus, PSC, which can significantly reduce scan times, can be provided together with the ARFCN.

Alternatively, in cases where target cell 114 is GSM-compliant, reselection information 112 can include a carrier frequency range and a base station identity code (BSIC). With this information, in GSM systems, target cell 114 can be uniquely identified. It is appreciated that similar data, e.g., data to uniquely identify or substantially narrow from among multiple potential cells can be provided in reselection information 112 in cases where other circuit switching platforms (e.g., other 2G/3G platforms) are leveraged.

Still referring to FIG. 1, system 100 can, in addition, include network message component 110 that can be configured to construct RRC connection request message 104 with reselection information 112 associated with target cell 114 that will manage CSFB for user equipment 106. As discussed previously, the nature of reselection information 112 can depend upon the underlying circuit switching technology utilized by target cell 114. Yet, a feature of reselection information 112 can be efficient identification of cell site 114 that is provided in connection with RRC connection reject message 108.

As a result, upon receipt of RRC connection reject message 108, user equipment 106 can process reselection information 112 to identify target cell 114, and thereafter establish a CSFB call, even though an RRC connection was not completed, but rather rejected. As depicted, this CSFB call can be managed by target cell 114 that interfaces to circuit switching core network 116 as opposed to LTE core network 118.

It is noted that in accordance with the enhancements described herein, CSFB voice call setup times can be significantly reduced, e.g., on the order of more than 200 milliseconds per call. In addition, RRC signaling can also be significantly reduced, which can lower processing loads for both user equipment and network elements. Hence, resource savings for both user equipment (e.g., processing bandwidth, battery life . . . ) and network elements can be realized, potentially resulting in higher quality of service and improved customer experiences.

Figure 4:
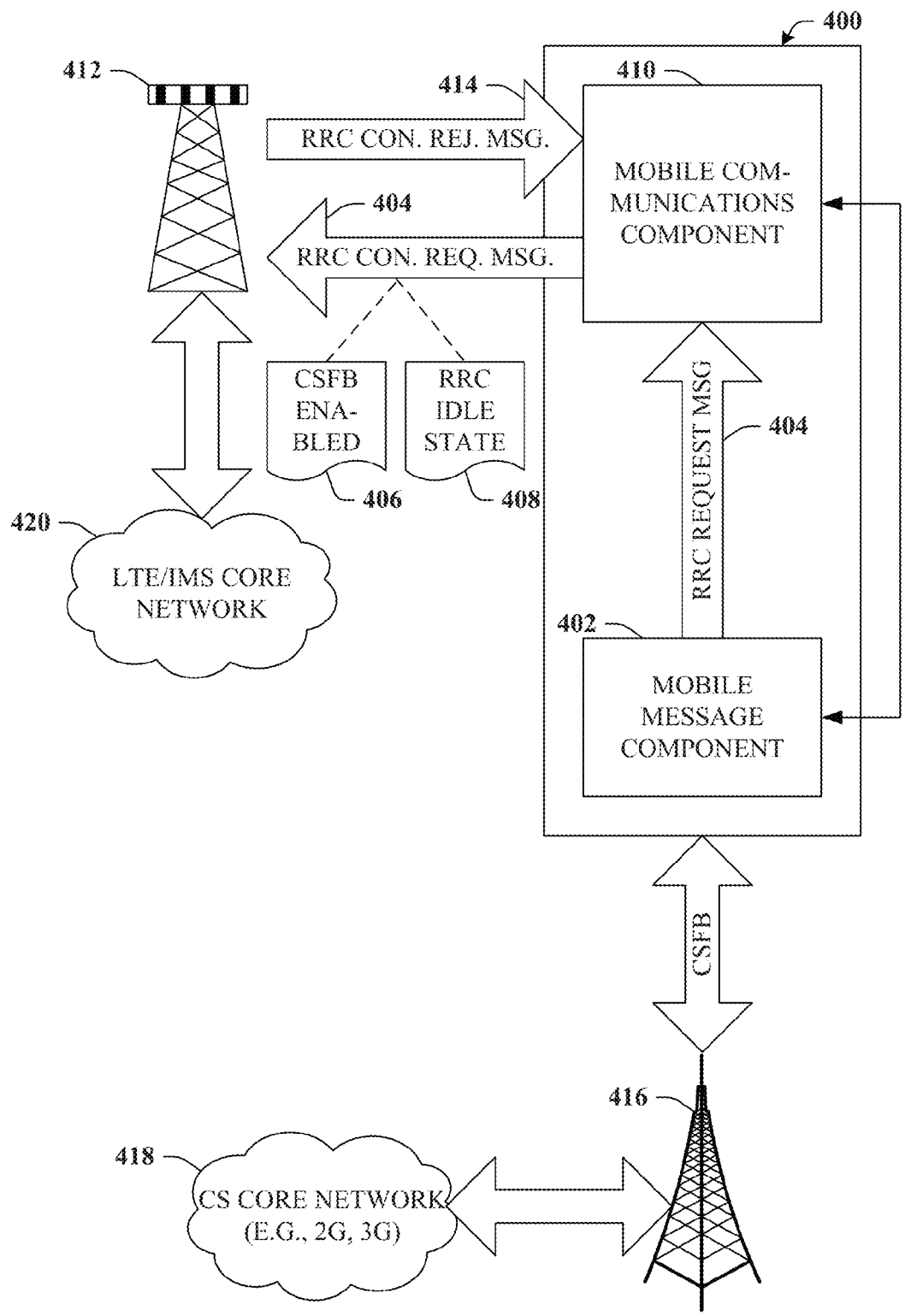
FIG. 4 illustrates a block diagram of a system that can provide handset-oriented enhancements in connection with CSFB.

With reference now to FIG. 4, system 400 that can provide handset-oriented enhancements in connection with CSFB is illustrated. Generally, system 400 can include mobile message component 402 that can be configured to construct RRC connection request message 404. In more detail, RRC connection request message 404 can include indication 406 that CSFB is supported or simply based on the two new Establishment causes such MO Call CSFB and MT Call CSFB. In addition, RRC connection request message 404 can also include indication 408 of an idle status in connection with an RRC connection state, which can be either an express or inherent indication. It is therefore appreciated that RRC connection request message 404 can be substantially similar to RRC connection request message 104 detailed in connection with FIG. 1. Thus, features or aspects associated with RRC connection request message 104 can exist with respect to RRC connection request message 404, and vice versa. It is understood that RRC connection request message 404 can be transmitted in connection with a mobile originating or a mobile terminating CSFB call.

Furthermore, system 400 can include mobile communications component 410 that can be configured to transmit RRC connection request message 404 to eNB 412 of an LTE-based mobile communications network. Hence, eNB 412 can be coupled to LTE core network 420. In response to RRC connection request message 404 transmitted by mobile communications component 410, RRC connection reject message 414 can be received by mobile communications component 410.

In one or more aspect, RRC connection reject message 414 can include reselection information associated with target cell 416 that has been identified to manage CSFB for user equipment associated with RRC connection request message 404 (e.g., user equipment that includes system 400). Accordingly, target cell 416 can be a UMTS node B, a GSM base station, and so forth and thus associated with circuit switching network 418.

Although nominally intended to serve as a rejection of RRC connection request message 404, RRC connection reject message 414 can also be utilized to convey pertinent data with respect to a CSFB connection. For example, in one or more aspect, reselection information included in RRC connection reject message 414 can include an ARFCN and a PSC, which can be utilized in connection with target cell 416 that is configured according to UMTS. Likewise, in one or more aspect, reselection information included in RRC connection reject message 414 can include a carrier frequency range and a BSIC, which can uniquely identify target cell 416 that is associated with GSM technologies.

Figure 5A:
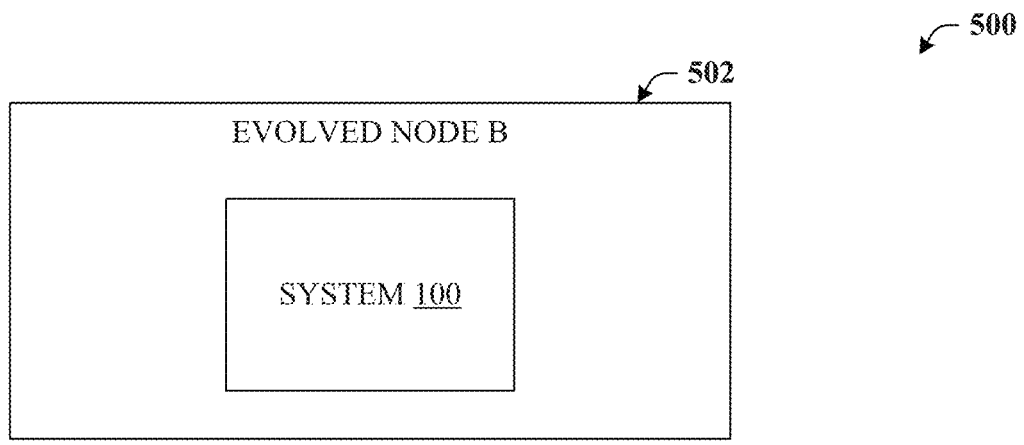
FIG. 5A depicts a block diagram of a system is configured such that all or a portion of the components described herein can be included in an evolved node B.
Figure 5B:
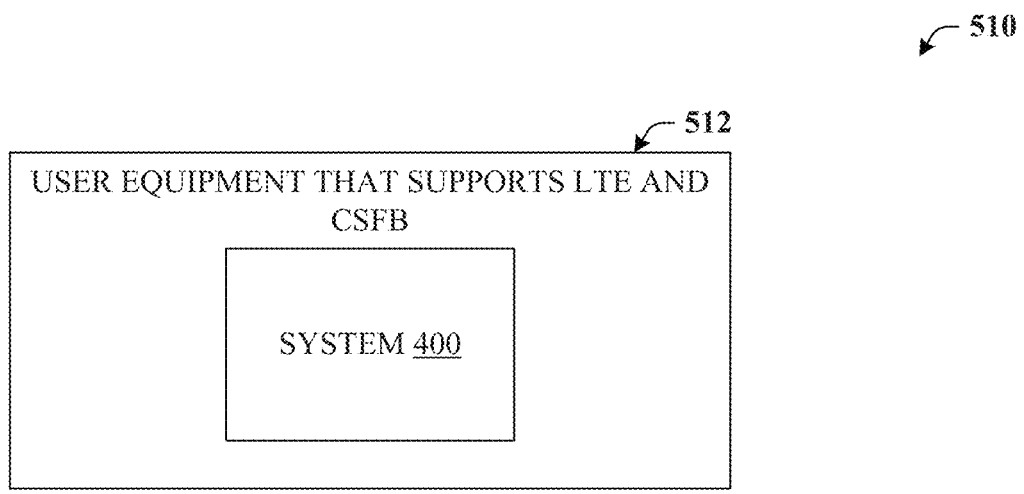
FIG. 5B illustrates a block diagram of a system in which all or a portion of the components described herein can be included in user equipment that supports long term evolution (LTE) and CSFB.

With reference now to FIGS. 5A-B, various design configurations are depicted. In particular, FIG. 5A relates to system 500 that can be configured such that all or a portion of system 100 can be included in eNB 502. Likewise, FIG. 5B relates to system 510 in which all or a portion of system 400 can be included in user equipment 512 that supports LTE and CSFB. In particular, eNB 502 as well as user equipment 512 can be configured to support 3GPP LTE according to TS36.331.

It is understood that components described herein associated with system 100 or system 400 can exist as combinations of both hardware or software. For example, network communications component 102 and network message component 110 of system 100 as well as mobile message component 402 and mobile communications component 410 of system 400 can be embodied in whole or in part as hardware devices or as instructions executable by a processor and stored in a non-transitory computer readable medium.

Figure 6:
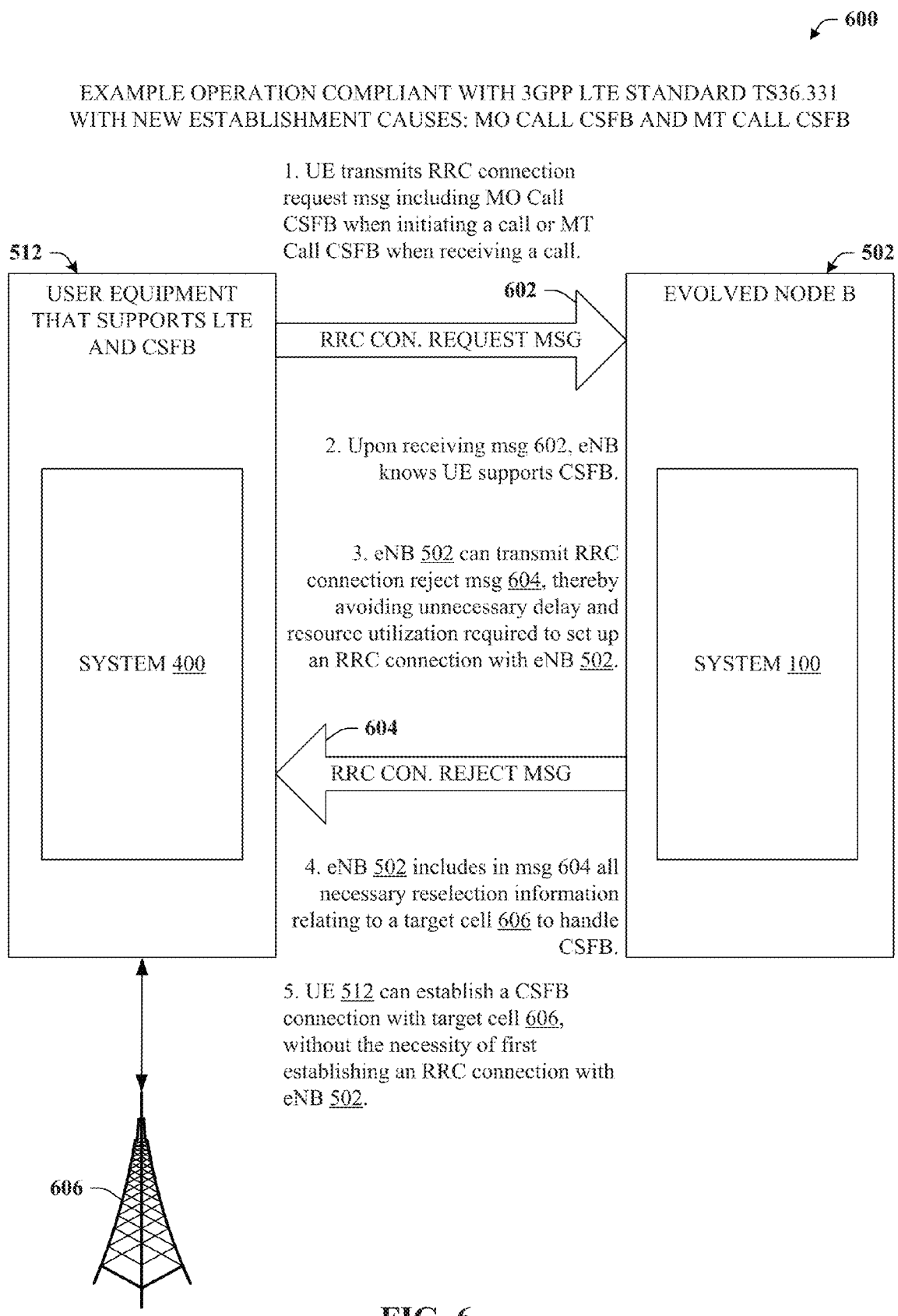
FIG. 6 provides a block diagram of a system that exemplifies operation compliant with 3GPP LTE standard TS36.331 with two new Establishment Causes.

Turning now to FIG. 6, system 600 illustrates an example operation compliant with 3GPP LTE standard TS36.331 with two new Establishment Causes, 1) MO Call CSFB and MT Call CSFB. In general, system 600 can include eNB 502, which includes system 100 as detailed herein. Further, system 600 can include user equipment 512, which can be or can include system 400 as detailed herein. Initially, user equipment 512 transmits RRC connection request message 602, which includes MO Call CSFB when initiating a call or MT Call CSFB when receiving a call.

Upon receiving RRC connection request message 602, eNB 502 is notified that user equipment 512 supports CSFB. Typically, such will be the case by definition since if user equipment 512 did not support CSFB, then MO/MT Call CSFB Establishment Causes would not be included in RRC connection request message 602. Thus, by virtue of the fact that eNB 502 detects one of these two Establishment Causes in RRC connection request message 602, eNB 502 is thus inherently aware that user equipment 512 is CSFB-enabled. It is understood, however, that in alternative embodiments, such information can be expressly provided by way of RRC connection request message 602.

In addition, eNB 502 can perform a determination with respect to an RRC connection state of user equipment 512. In practice, user equipment 512 sends RRC Connection Request message only when it is in RRC Idle state. Regardless, if user equipment 512 is in an RRC connected state and has a MO or MT voice call to set up, user equipment 512 can send a Service Request and then eNB 502 can handle the request according to the conventional approach. Otherwise, in the case where user equipment 512 is not in an RRC connected state, it sends RRC connection request message 602 with MO/MT Call CSFB Establishment Causes, then eNB 502 can transmit RRC connection reject message 604.

RRC connection reject message 604 can include reselection information relating to target cell 606 that will support the CSFB call. Thus, upon receiving RRC connection reject message 604, user equipment 512 can establish a CSFB connection with target cell 606 without the necessity of first establishing an RRC connection with eNB 502. In practice, MO/MT Call CSFB Establishment Causes can be implemented as an extension to the convention RRC connection reject message. For example, this reject message can be enhanced with an added information element (IE) to include system information blocks (SIB) of a target UMTS or GSM cell. As noted supra, the SIB information can include the PSC and ARFCN information for UMTS target cells or the carrier frequency range and BSIC information for GSM target cells.

Furthermore, in one or more aspect, the above-mentioned Establishment Causes can be further extended to include emergency call features, such as 911 features or similar. For example, with such an extension, a network operator can define a different target cell than that used for normal voice, should such be desired. Moreover, the concept of further extending the Establishment causes can be applied to other services as well. For instance, values can be added to the Establishment Causes to allow for service-based target cell definition, which can enable expansive capabilities and flexibility in traffic management and layer management among the various technologies and carrier layers. Such can be implemented by the addition of IE in conventional RRC connection reject message to allow the network operator to specify different target cells for different service types such as, e.g., specifying a different target cell for any of voice only CSFB call, data and CSFB call, high speed data and CSFB call, low speed data and CSFB call, a guaranteed bit-rate (GBR) CSFB call or non-guaranteed bit-rate (NGBR) CSFB call, a CSFB call with both voice and data, and so forth.

Figure 7:
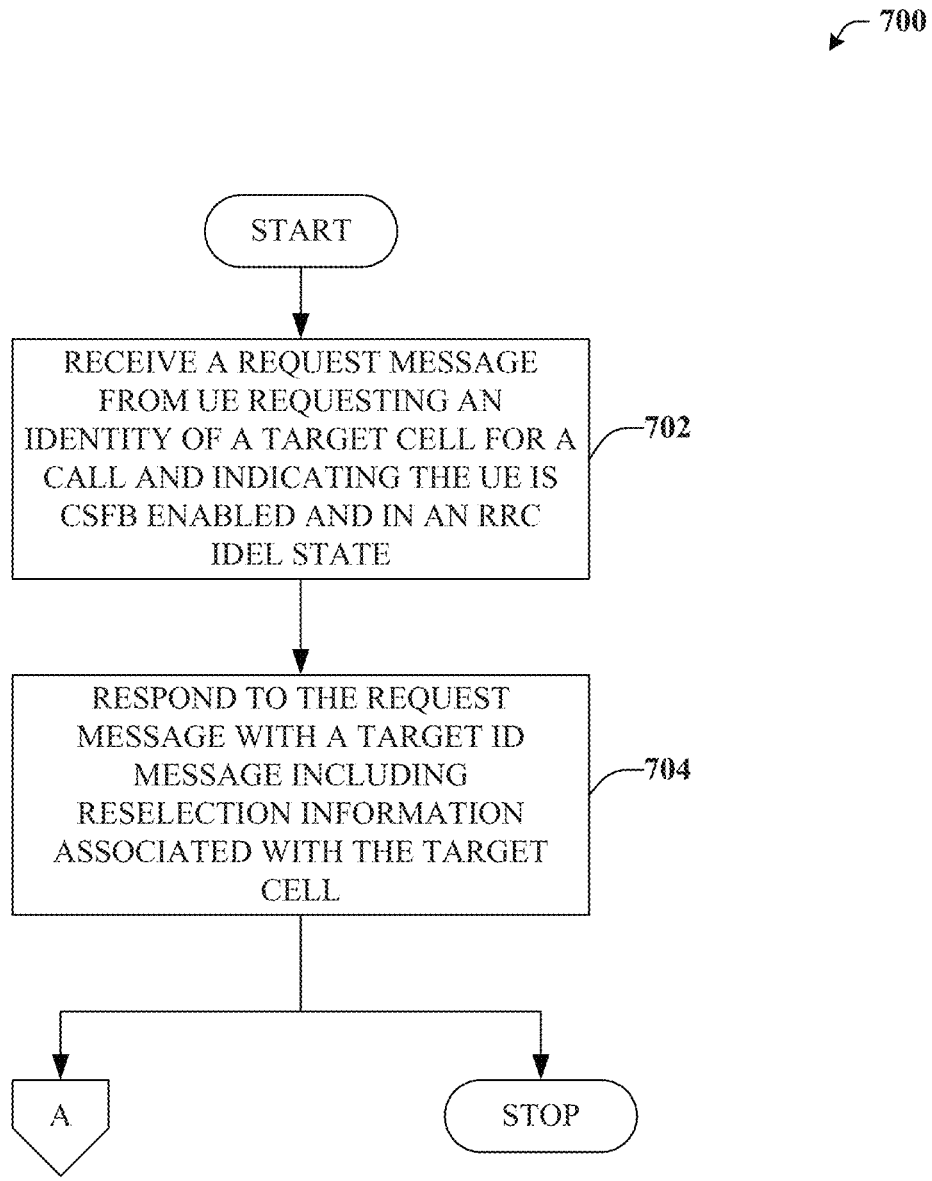
FIG. 7 depicts an exemplary flow chart of procedures defining a method for providing enhancements in connection with CSFB.
Figure 8:
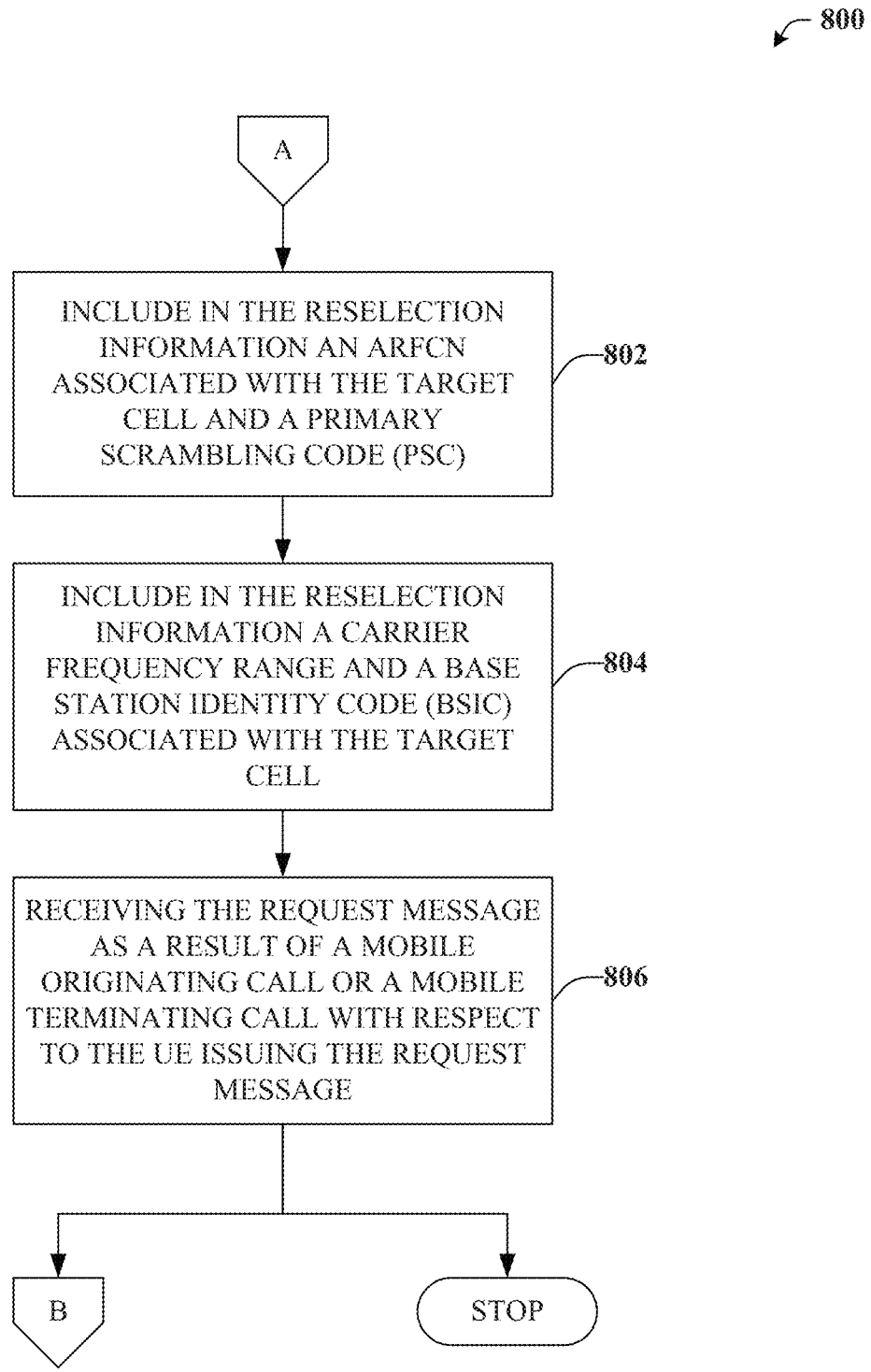
FIG. 8 is an exemplary flow chart of procedures that define a method for providing additional features or aspects in connection with providing enhancements for CSFB.

FIGS. 7 and 8 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 7, exemplary method 700 for providing enhancements in connection with CSFB is depicted. Generally, at reference numeral 702, a request message (e.g., an RRC connection request message) can be received from user equipment by way of a network element (e.g., an eNB) of a wireless communications network. This request message can be configured for requesting an identity for a target cell for a call (e.g., a CSFB call). Moreover, the request message can also indicate, either expressly or inherently, that user equipment is circuit switch fall back enabled and that the user equipment is in an RRC idle state. Additionally or alternatively, the request message can indicate, in the least, that the user equipment is not in an RRC connected state, so a MO or MT voice call can be set up.

Accordingly, at reference numeral 704, the request message can be responded to with a target ID message including reselection information associated with the target cell. In accordance with the above, it is appreciated that the user equipment therefore can acquire information (e.g., the reselection information) relating to the target cell, even without completing all the steps necessary to establish an RRC connection with an LTE network. As a result, the requisite signaling, processing, and delay typically incurred from establishing an RRC connection can be substantially reduced or mitigated.

Turning now to FIG. 8, exemplary method 800 for providing additional features or aspects in connection with providing enhancements for CSFB is illustrated. At reference numeral 802, an ARFCN associated with the target cell and a PSC can be included in the reselection information detailed in connection with reference numeral 704 of FIG. 7. Such information can be employed by the user equipment to efficiently select a UMTS-based target cell.

Similarly, at reference numeral 804, a carrier frequency range and a base station identity code associated with the target cell can be included in the reselection information. In this case, such reselection information can be suitable to uniquely identify a GSM-based target cell. Furthermore, at reference numeral 806, the request message received in connection with reference numeral 702 of FIG. 7 can be associated with either one of a mobile terminating call or a mobile originating call with respect to the user equipment.

Figure 9:
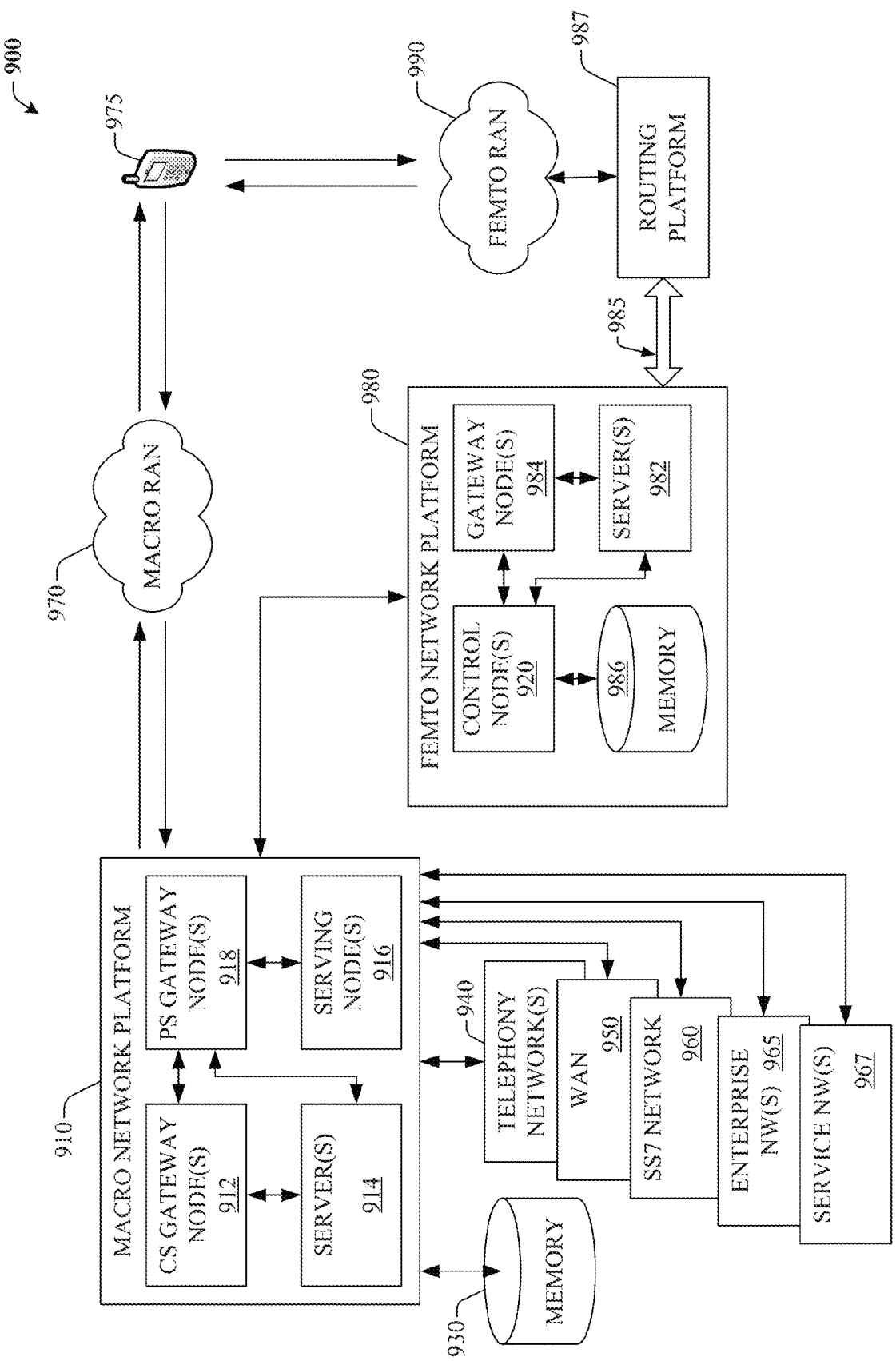
FIG. 9 illustrates a first example of a wireless communications environment with associated components that can be operable to a portion of the disclosed subject matter.

To provide further context for various aspects of the subject specification, FIG. 9 illustrates an example wireless communication environment 900, with associated components that can enable operation of a femtocell enterprise network in accordance with aspects described herein. Wireless communication environment 900 includes two wireless network platforms: (i) A macro network platform 910 that serves, or facilitates communication) with user equipment 975 via a macro radio access network (RAN) 970. It should be appreciated that in cellular wireless technologies (e.g., 4G, 3GPP UMTS, HSPA, 3GPP LTE, 3GPP UMB), macro network platform 910 is embodied in a Core Network. (ii) A femto network platform 980, which can provide communication with UE 975 through a femto RAN 990, linked to the femto network platform 980 through a routing platform 92 via backhaul pipe(s) 985, wherein backhaul pipe(s) are substantially the same a backhaul link 3853 below. It should be appreciated that femto network platform 980 typically offloads UE 975 from macro network, once UE 975 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 970 can comprise various coverage cells like cell 1205, while femto RAN 990 can comprise multiple femto access points. As mentioned above, it is to be appreciated that deployment density in femto RAN 990 is substantially higher than in macro RAN 970.

Generally, both macro and femto network platforms 910 and 980 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 910 includes CS gateway node(s) 912 which can interface CS traffic received from legacy networks like telephony network(s) 940 (e.g., public switched telephone network (PSTN), or public land mobile network (PLMN)) or a SS7 network 960. Circuit switched gateway 912 can authorize and authenticate traffic (e.g., voice) arising from such networks. Additionally, CS gateway 912 can access mobility, or roaming, data generated through SS7 network 960; for instance, mobility data stored in a VLR, which can reside in memory 930. Moreover, CS gateway node(s) 912 interfaces CS-based traffic and signaling and gateway node(s) 918. As an example, in a 3GPP UMTS network, gateway node(s) 918 can be embodied in gateway GPRS support node(s) (GGSN).

In addition to receiving and processing CS-switched traffic and signaling, gateway node(s) 918 can authorize and authenticate PS-based data sessions with served (e.g., through macro RAN) wireless devices. Data sessions can include traffic exchange with networks external to the macro network platform 910, like wide area network(s) (WANs) 950; it should be appreciated that local area network(s) (LANs) can also be interfaced with macro network platform 910 through gateway node(s) 918. Gateway node(s) 918 generates packet data contexts when a data session is established. To that end, in an aspect, gateway node(s) 918 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 914. It is to be noted that in 3GPP UMTS network(s), gateway node(s) 918 (e.g., GGSN) and tunnel interface (e.g., TTG) comprise a packet data gateway (PDG).

Macro network platform 910 also includes serving node(s) 916 that convey the various packetized flows of information or data streams, received through gateway node(s) 918. As an example, in a 3GPP UMTS network, serving node(s) can be embodied in serving GPRS support node(s) (SGSN).

As indicated above, server(s) 914 in macro network platform 910 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 910. Data streams can be conveyed to gateway node(s) 918 for authorization/authentication and initiation of a data session, and to serving node(s) 916 for communication thereafter. Server(s) 914 can also effect security (e.g., implement one or more firewalls) of macro network platform 910 to ensure network's operation and data integrity in addition to authorization and authentication procedures that CS gateway node(s) 912 and gateway node(s) 918 can enact. Moreover, server(s) 914 can provision services from external network(s), e.g., WAN 950, or Global Positioning System (GPS) network(s) (not shown). It is to be noted that server(s) 914 can include one or more processor configured to confer at least in part the functionality of macro network platform 910. To that end, the one or more processor can execute code instructions stored in memory 930, for example.

In example wireless environment 900, memory 930 stores information related to operation of macro network platform 910. Information can include business data associated with subscribers; market plans and strategies, e.g., promotional campaigns, business partnerships; operational data for mobile devices served through macro network platform; service and privacy policies; end-user service logs for law enforcement; and so forth. Memory 930 can also store information from at least one of telephony network(s) 940, WAN(s) 950, or SS7 network 960, enterprise NW(s) 965, or service NW(s) 967.

Femto gateway node(s) 984 have substantially the same functionality as PS gateway node(s) 918. Additionally, femto gateway node(s) 984 can also include substantially all functionality of serving node(s) 916. In an aspect, femto gateway node(s) 984 facilitates handover resolution, e.g., assessment and execution. Further, control node(s) 920 can receive handover requests and relay them to a handover component (not shown) via gateway node(s) 984. According to an aspect, control node(s) 920 can support RNC capabilities.

Server(s) 982 have substantially the same functionality as described in connection with server(s) 914. In an aspect, server(s) 982 can execute multiple application(s) that provide service (e.g., voice and data) to wireless devices served through femto RAN 990. Server(s) 982 can also provide security features to femto network platform. In addition, server(s) 982 can manage (e.g., schedule, queue, format . . . ) substantially all packetized flows (e.g., IP-based, frame relay-based, ATM-based) it generates in addition to data received from macro network platform 910. It is to be noted that server(s) 982 can include one or more processor configured to confer at least in part the functionality of macro network platform 910. To that end, the one or more processor can execute code instructions stored in memory 986, for example.

Memory 986 can include information relevant to operation of the various components of femto network platform 980. For example operational information that can be stored in memory 986 can comprise, but is not limited to, subscriber information; contracted services; maintenance and service records; femto cell configuration (e.g., devices served through femto RAN 990; access control lists, or white lists); service policies and specifications; privacy policies; add-on features; and so forth.

It is noted that femto network platform 980 and macro network platform 910 can be functionally connected through one or more reference link(s) or reference interface(s). In addition, femto network platform 980 can be functionally coupled directly (not illustrated) to one or more of external network(s) 940, 950, 960, 965 or 967. Reference link(s) or interface(s) can functionally link at least one of gateway node(s) 984 or server(s) 986 to the one or more external networks 940, 950, 960, 965 or 967.

Figure 10:
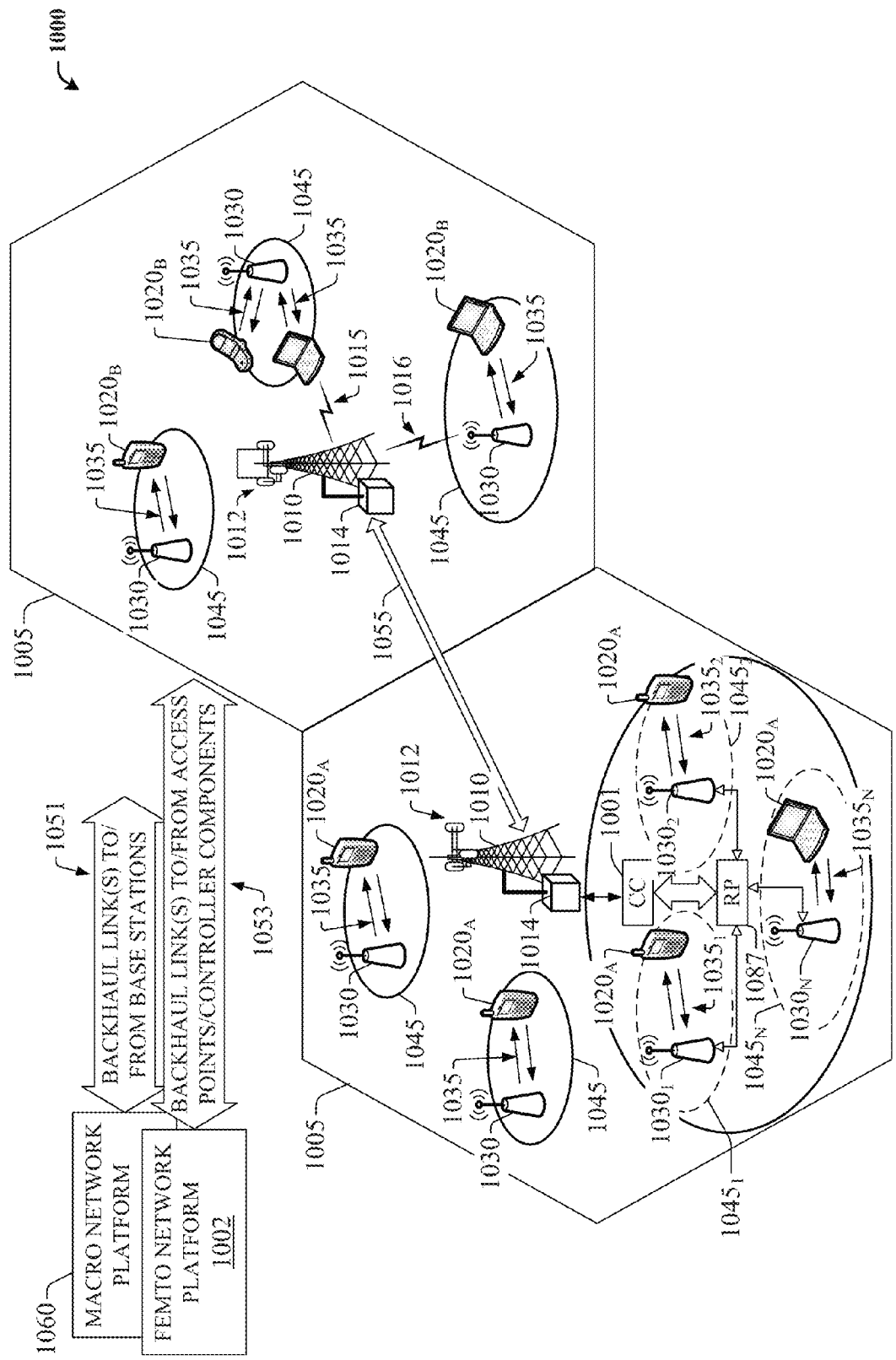
FIG. 10 illustrates a second example of a wireless communications environment with associated components that can be operable to a portion of the disclosed subject matter.

FIG. 10 illustrates a wireless environment that includes macro cells and femtocells for wireless coverage in accordance with aspects described herein. In wireless environment 1050, two areas 1005 represent "macro" cell coverage; each macro cell is served by a base station 1010. It can be appreciated that macro cell coverage area 1005 and base station 1010 can include functionality, as more fully described herein, for example, with regard to system 1000. Macro coverage is generally intended to serve mobile wireless devices, like UE $1020_A$, $1020_B$, in outdoors locations. An over-the-air wireless link 105 provides such coverage, the wireless link 1215 comprises a downlink (DL) and an uplink (UL), and utilizes a predetermined band, licensed or unlicensed, of the radio frequency (RF) spectrum. As an example, UE $1020_A$, $1020_B$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 1010 communicates via backhaul link(s) 1051 with a macro network platform 1060, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 1060 controls a set of base stations 1010 that serve either respective cells or a number of sectors within such cells. Base station 1010 comprises radio equipment 1014 for operation in one or more radio technologies, and a set of antennas 1012 (e.g., smart antennas, microwave antennas, satellite dish(es) . . . ) that can serve one or more sectors within a macro cell 1005. It is noted that a set of radio network control node(s), which can be a part of macro network platform; a set of base stations (e.g., Node B 1010) that serve a set of macro cells 1005; electronics, circuitry or components associated with the base stations in the set of base stations; a set of respective OTA wireless links (e.g., links 1015 or 1016) operated in accordance to a radio technology through the base stations; and backhaul link(s) 1055 and 1051 form a macro radio access network (RAN). Macro network platform 1060 also communicates with other base stations (not shown) that serve other cells (not shown). Backhaul link(s) 1051 or 1053 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 1055 link disparate base stations 1010. According to an aspect, backhaul link 1053 can connect multiple femto access points 1030 and/or controller components (CC) 1001 to the femto network platform 1002. In one example, multiple femto APs can be connected to a routing platform (RP) 1087, which in turn can be connect to a controller component (CC) 1001. Typically, the information from UEs $1020_A$ can be routed by the RP 102, for example, internally, to another UE $1020_A$ connected to a disparate femto AP connected to the RP 1087, or, externally, to the femto network platform 1002 via the CC 1001, as discussed in detail supra.

In wireless environment 1050, within one or more macro cell(s) 1005, a set of femtocells 1045 served by respective femto access points (APs) 1030 can be deployed. It can be appreciated that, aspects of the subject innovation are geared to femtocell deployments with substantive femto AP density, e.g., $10^4$-$10^7$ femto APs 1030 per base station 1010. According to an aspect, a set of femto access points $1030_1$-$1030_N$, with N a natural number, can be functionally connected to a routing platform 1087, which can be functionally coupled to a controller component 1001. The controller component 1001 can be operationally linked to the femto network platform 330 by employing backhaul link(s) 1053. Accordingly, UE $1020_A$ connected to femto APs $1030_1$-$1030_N$ can communicate internally within the femto enterprise via the routing platform (RP) 1087 and/or can also communicate with the femto network platform 1002 via the RP 1087, controller component 1001 and the backhaul link(s) 1053. It can be appreciated that although only one femto enterprise is depicted in FIG. 10, multiple femto enterprise networks can be deployed within a macro cell 1005.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can include legacy telecommunication technologies.

With respect to FIG. 10, in example embodiment 1000, femtocell AP 1010 can receive and transmit signal(s) (e.g., traffic and control signals) from and to wireless devices, access terminals, wireless ports and routers, etc., through a set of antennas $1069_1$-$1169_N$. It should be appreciated that while antennas $1069_1$-$1069_N$ are a part of communication platform 1025, which comprises electronic components and associated circuitry that provides for processing and manipulating of received signal(s) (e.g., a packet flow) and signal(s) (e.g., a broadcast control channel) to be transmitted. In an aspect, communication platform 1025 includes a transmitter/receiver (e.g., a transceiver) 1066 that can convert signal(s) from analog format to digital format upon reception, and from digital format to analog format upon transmission. In addition, receiver/transmitter 1066 can divide a single data stream into multiple, parallel data streams, or perform the reciprocal operation. Coupled to transceiver 1066 is a multiplexer/demultiplexer 1067 that facilitates manipulation of signal in time and frequency space. Electronic component 1067 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1067 can scramble and spread information (e.g., codes) according to substantially any code known in the art; e.g., Hadamard-Walsh codes, Baker codes, Kasami codes, polyphase codes, and so on. A modulator/demodulator 1068 is also a part of operational group 1025, and can modulate information according to multiple modulation techniques, such as frequency modulation, amplitude modulation (e.g., M-ary quadrature amplitude modulation (QAM), with M a positive integer), phase-shift keying (PSK), and the like.

FAP 1010 also includes a processor 1045 configured to confer functionality, at least partially, to substantially any electronic component in the femto access point 1010, in accordance with aspects of the subject innovation. In particular, processor 1045 can facilitate FAP 1010 to implement configuration instructions received through communication platform 1025, which can include storing data in memory 1055. In addition, processor 1045 facilitates FAP 1010 to process data (e.g., symbols, bits, or chips) for multiplexing/demultiplexing, such as effecting direct and inverse fast Fourier transforms, selection of modulation rates, selection of data packet formats, inter-packet times, etc. Moreover, processor 1045 can manipulate antennas $1069_1$-$1069_N$ to facilitate beamforming or selective radiation pattern formation, which can benefit specific locations (e.g., basement, home office . . . ) covered by FAP; and exploit substantially any other advantages associated with smart-antenna technology. Memory 1055 can store data structures, code instructions, system or device information like device identification codes (e.g., IMEI, MSISDN, serial number . . . ) and specification such as multimode capabilities; code sequences for scrambling; spreading and pilot transmission, floor plan configuration, access point deployment and frequency plans; and so on. Moreover, memory 1055 can store configuration information such as schedules and policies; FAP address(es) or geographical indicator(s); access lists (e.g., white lists); license(s) for utilization of add-features for FAP 1010, and so forth.

In embodiment 1000, processor 1045 is coupled to the memory 1055 in order to store and retrieve information necessary to operate and/or confer functionality to communication platform 1025, broadband network interface 1035 (e.g., a broadband modem), and other operational components (e.g., multimode chipset(s), power supply sources . . . ; not shown) that support femto access point 1010. In addition, it is to be noted that the various aspects disclosed in the subject specification can also be implemented through (i) program modules stored in a computer-readable storage medium or memory (e.g., memory 1086 or memory 1055) and executed by a processor (e.g., processor 1045), or (ii) other combination(s) of hardware and software, or hardware and firmware.

Referring now to FIG. 12, there is illustrated a block diagram of an exemplary computer system operable to execute the disclosed architecture. In order to provide additional context for various aspects of the disclosed subject matter, FIG. 12 and the following discussion are intended to provide a brief, general description of a suitable computing environment 1200 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include either volatile or nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Figure 11:
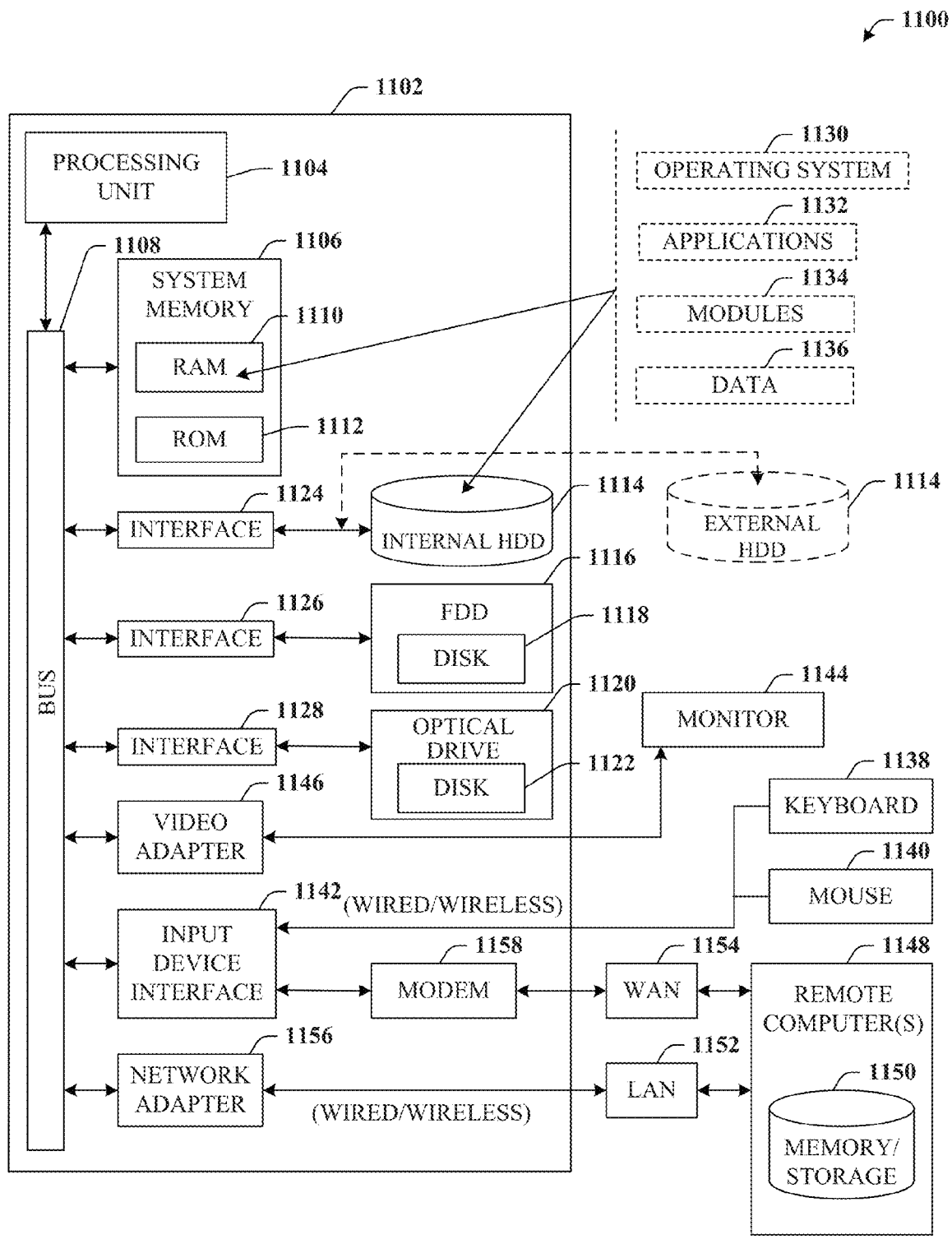
FIG. 11 illustrates a block diagram of an example computer operable to execute a portion of the disclosed architecture.

With reference again to FIG. 11, the exemplary environment 1100 for implementing various aspects of the disclosed subject matter includes a computer 1102, the computer 1102 including a processing unit 1104, a system memory 1106 and a system bus 1108. The system bus 1108 couples to system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the disclosed subject matter can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, a mobile device, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

What is claimed is:

1. A system, comprising:
a memory to store executable instructions; and
a processor, coupled to the memory, that facilitates execution of the executable instructions to perform operations, comprising:
receiving a radio resource control connection request message from a user equipment, wherein the radio resource control connection request message comprises an indication that the user equipment is not in a radio resource control connected state and another indication that the user equipment is in a radio resource control idle state;
generating a radio resource control connection reject message with reselection information associated with a device of a target cell to manage, for the user equipment, a circuit switched-based communication in connection with a switch from a packet-based communication to the circuit switched-based communication; and
in response to the receiving the radio resource control connection request message with the indication, transmitting the radio resource control connection reject message.

2. The system of claim 1, wherein the processor is included in an evolved node B device that supports third generation partnership project long term evolution.

3. The system of claim 1, wherein the radio resource control connection request message is associated with a mobile originating voice call.

4. The system of claim 1, wherein the radio resource control connection request message is associated with a mobile terminating voice call.

5. The system of claim 1, wherein the radio resource control connection request comprises an indication that the user equipment supports the switch from the packet-based communication to the circuit switched-based communication in connection with a voice call.

6. The system of claim 1, wherein the device of the target cell supports universal mobile telecommunications system communications and the reselection information comprises an absolute radio frequency channel number and a scrambling code.

7. The system of claim 1, wherein the device of the target cell supports global system for mobile communications and the reselection information comprises a carrier frequency range and a base station device identity code.

8. A system, comprising:
a memory to store executable instructions; and
a processor, coupled to the memory, that facilitates execution of the executable instructions to perform operations, comprising:
creating a radio resource control connection request message with an indication that an user equipment is not in a radio resource control connected state and another indication that the user equipment is in a radio resource control idle state; and transmitting the radio resource control connection request message to an evolved node B device of a mobile communications network, and receiving a radio resource control connection reject message in response to the radio resource control request message being determined to comprise the indication.

9. The system of claim 8, wherein the processor is included in a mobile device that supports third generation partnership project long term evolution.

10. The system of claim 8, wherein the radio resource control connection reject message comprises reselection information associated with a device of a target cell identified to manage a circuit switched fall back protocol for a mobile device associated with the radio resource control connection request message.

11. The system of claim 10, wherein the device of the target cell supports a universal mobile telecommunications system protocol and the reselection information comprises an absolute radio frequency channel number and a scrambling code.

12. The system of claim 10, wherein the device of the target cell supports a global system for mobile communications protocol and the reselection information comprises a carrier frequency range and an identity code of a base station device.

13. The system of claim 8, wherein the creating the radio resource control connection request message further comprises creating the radio resource control connection request message in connection with a mobile originating call.

14. The system of claim 8, wherein the creating the radio resource control connection request message further comprises creating the radio resource control connection request message in connection with a mobile terminating call.

15. A method, comprising:
receiving, by a system comprising a processor, a request message from a portable device by way of a network device of a wireless communications network, wherein the request message comprises a first indicator indicating the portable device is in a radio resource control idle state and a second indicator indicating the portable device is not in a radio resource control connected state; and responding, by the system, to the request message comprising the first indicator and the second indicator with a target message comprising circuit switched fall back reselection information associated with a device of a target cell.

16. The method of claim 15, wherein the responding comprises responding to the request message with the circuit switched fall back reselection information comprising an absolute radio frequency channel number associated with the device of the target cell and a scrambling code.

17. The method of claim 15, wherein the responding comprises responding to the request message with the circuit switched fall back reselection information comprising a carrier frequency range and a base station identity code associated with the device of the target cell.

18. The method of claim 15, wherein the receiving the request message is associated with a mobile terminating call in connection with the portable device.

19. The method of claim 15, wherein the request message further indicates the portable device is circuit switched fall back enabled.

20. The method of claim 15, wherein the request message relates to a mobile originated communication procedure.

* * * * *